United States Patent Office
3,444,383
Patented May 13, 1969

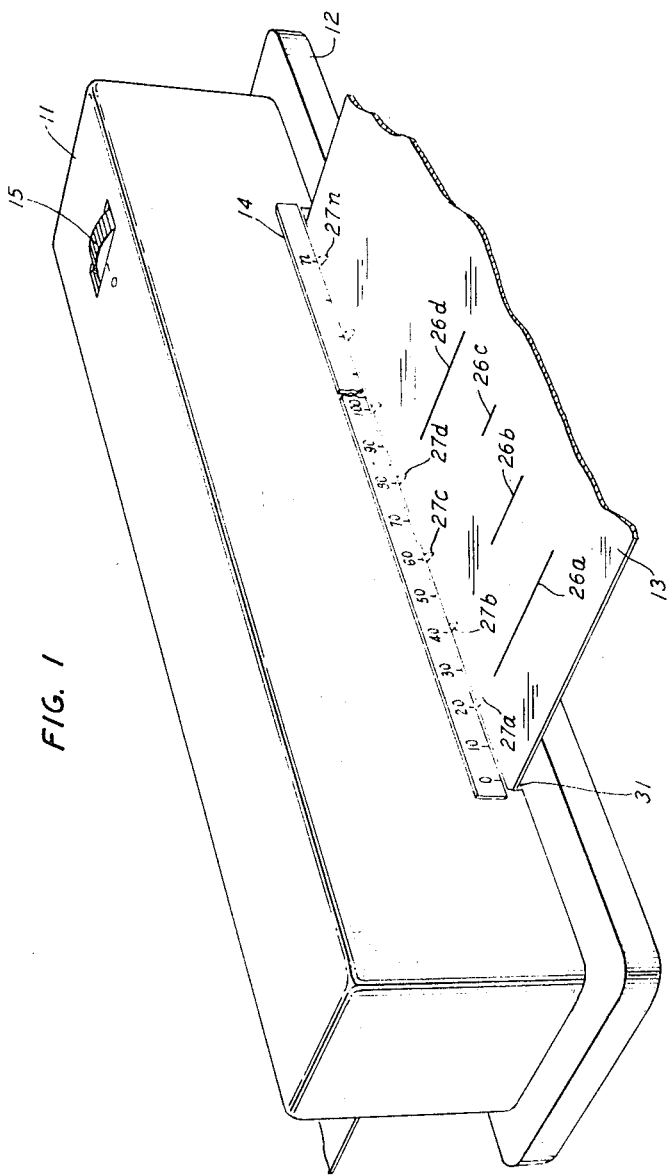

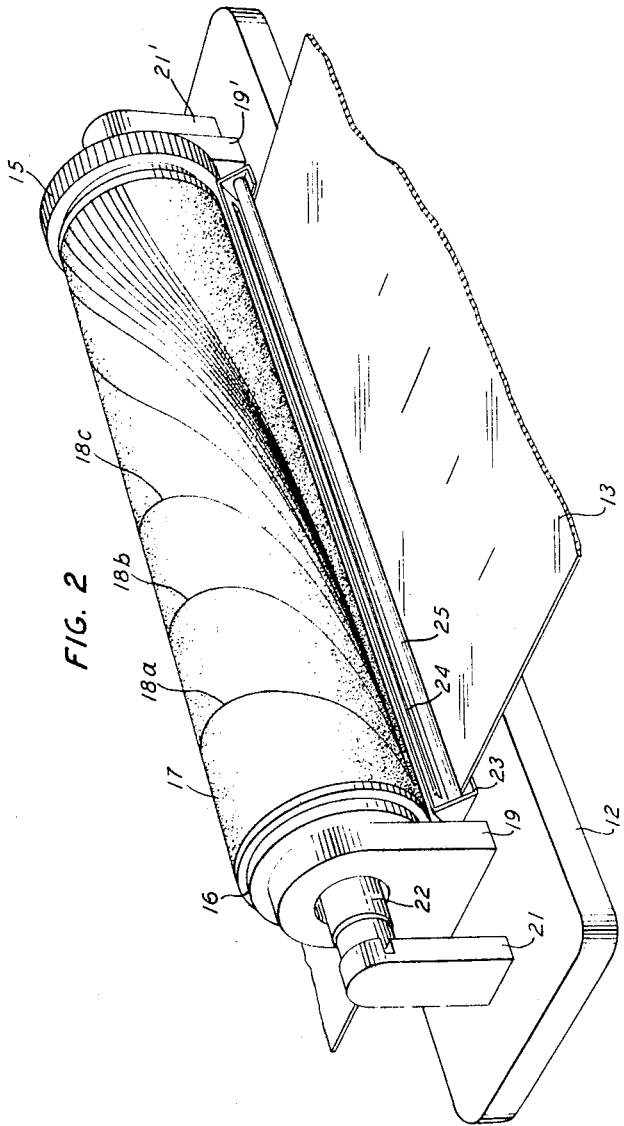
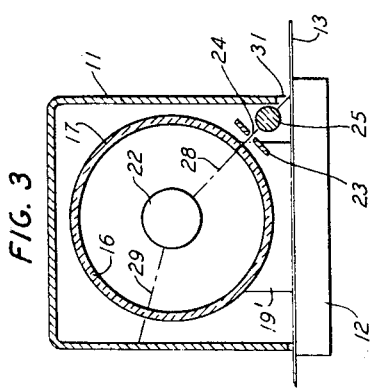

3,444,383
OPTICAL MEASURING APPARATUS FOR DETERMINING INTERSPATIAL DISTANCES
Leon D. Harmon, Watchung, N.J., assignor to Bell Telephone Laboratories, Incorporated, Murray Hill and Berkeley Heights, N.J., a corporation of New York
Filed Aug. 15, 1966, Ser. No. 572,564
Int. Cl. G01n *21/30*
U.S. Cl. 250—219                                                4 Claims This invention pertains to measuring instruments and, more particularly, to optical measuring apparatus.

In the various and diverse fields of scientific and engineering endeavor, the reduction of data to a graphical presentation is a common occurrence. A significant proportion of analysis time is spent accurately measuring and interpreting such recorded data. Interpretation by itself, however, is often a routine matter once accurate measurements have been made. This is particularly true in those fields where recorded data, representing signals of a harmonic nature are obtained in a "noisy" environment. A few exemplary sciences and arts where the harmonic relationships of information signals is of utmost importance are, among others, acoustics, geology, electronics and the general field of vibratory analysis. Not uncommonly, recorded data manifest themselves as series of visual indications representative of the presence of energy at a plurality of frequencies. Typical tasks are to determine the fundamental frequency, which may not be of sufficient energy to provide an indication on the graph or chart, or to determine if a specified harmonic signal is present.

It has been the common practice to use mechanical apparatus for accomplishing these typical tasks. For example, mechanical instruments used for this and other related purposes are shown and described in Patents 2,530,955 and 2,561,020, issued to H. J. Gerber, on Nov. 21, 1950, and July 17, 1951, respectively.

The disadvantages inherent in the use of mechanical apparatus of this nature are readily apparent. The manufacture of accurate mechanical instruments is expensive and time consuming. Not only is expense a problem, however; mechanical instruments are also subject to alterations due to wear and to environmental changes, e.g., temperature fluctuations.

It is, therefore, an object of this invention to overcome these disadvantages and difficulties of prior art instruments. Furthermore, it is an object of this invention to perform the functions of prior art apparatus, for example, of the type described above, in a more accurate and efficient manner, and to permit rapid acquisition of precise interpretative indications.

By the practice of this invention, these and other objects are accomplished by utilizing optical apparatus capable of developing discrete and accurately displaced beams of light whose interspatial separations may be varied with ease and accuracy. More particularly, in accordance with the present invention, a translucent cylindrical member is enveloped by an opaque member having transparent portions, preferably lines emanating from a common point, that encircle the cylindrical member. The cylindrical member or roller is totally enclosed in an opaque case except for a narrow slit mask parallel to the roller which allows rays of light to emanate from the areas where the transparent lines, encircling the roller, coincide with the slit in the mask. The interior of the cylindrical member is illuminated to allow passage of predetermined light rays through the intersectional areas of the transparent encircling lines and the slit of the mask.

The described apparatus may be used for determining the harmonic relationship of visual indicia, for example, indications on a spectrographic chart representative of a received acoustical signal. Apparatus of this invention is simply placed upon the chart and the roller rotated until the spatial positions of the several equidistant light rays, emanating from the apparatus, correspond with the indications on the chart. The angular position of the roller may be calibrated to indicate the basic harmonic relationship of the illuminated chart indications, for example, the fundamental frequency of the received signals. It is to be understood, of course, that this described use is merely exemplary and that many diverse uses may be implemented, by draftsmen, engineers, scientists and others, analogous to the uses which mechanical instruments have heretofore served.

These and other features and objects of this invention, its nature and various advantages may be more readily understandable by reference to the following detailed description of an illustrative embodiment thereof, illustrated by the appended drawings, in which:

FIG. 1 illustrates, generally, the apparatus of the present invention;

FIG. 2 is an illustration of the internal structure of the apparatus of this invention;

FIG. 3 is a diagram of the optical configuration of the present invention; and

Figure 4:
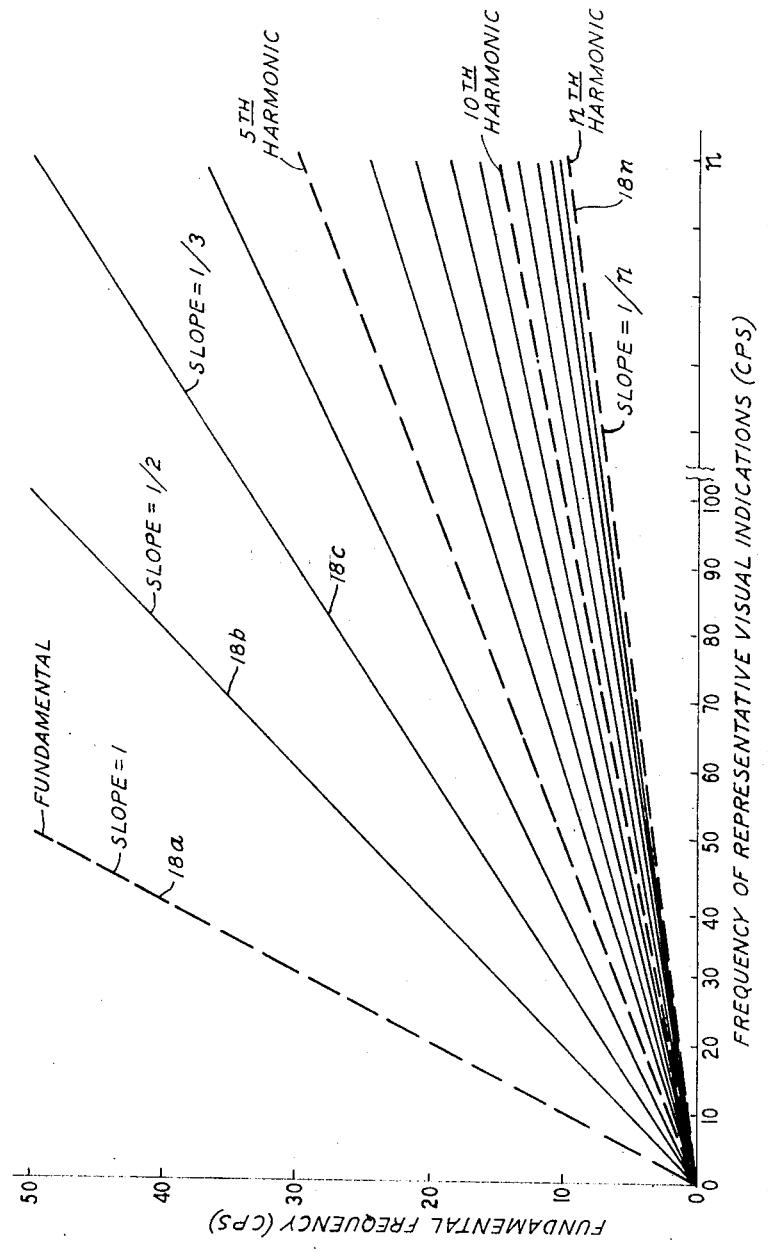
FIG. 4 illustrates the relationship of the various transparent lines encircling the cylindrical member of the present invention.

In FIG. 1 there is shown an embodiment of the present invention which, illustratively, is used for determining the harmonic relationship of recorded data, for example, visual indications 26 on a chart 13. An opaque case 11 which surrounds the internal structure of the apparatus, is mounted on a base 12. Aperture 31, between case 11 and base 12, allows chart 13 to be inserted therein. Chart 13, which may be laterally positioned by suitable guide members, not shown in the drawing, is inserted until the visual indications 26 are directly below scale 14. Rotational knob 15 is then rotated, turning the internal cylinder which bears the light-ray position-determining apparatus, not shown here, until the light rays 27 emanating from within case 11, in a predetermined manner, illuminate indications 26. Knob 15 may be calibrated, as described hereinafter, to indicate, for example, the fundamental frequency of the recorded data represented by indications 26. For example, when indications 26 are illuminated by the beams of light 27, it is noted that the basic interspatial distance between indications corresponds to the factor 20 on scale 14. Thus, illustratively, the fundamental frequency of the recorded data is 20 cycles per second (c.p.s.) with harmonics at frequencies of 40, 60 and 80 c.p.s. Appropriate markings on knob 15 will thus indicate the basic harmonic relationship of the representative visual indications as 20 c.p.s. It will be appreciated that there is one and only one position of the knob 15 which provides this coincidence; the indications are unique. Assume for the moment, however, that the fundamental frequency component 26a was not detected and is thus not indicated on chart 13. Coincidence of the beams of light 27 and the visual indications 26 could still only be established at frequencies of 40, 60 and 80 c.p.s., i.e., at indications 26b, 26c, and 26d. Thus the undetected fundamental frequency component, at 20 c.p.s., would still be indicated by the coincidence of a light ray and a marking on the scale 14 or the graduations on knob 15.

Another exemplary use of the present invention is also illustrated by the apparatus of FIG. 1. Assume that indications 26 are related by a predetermined basic interspatial difference, and it is desired to accurately locate proportional indications, for example, separated by half this predetermined interspatial difference. Once coincidence is established, between the emanating light rays 27 and the indications 26, it is a simple matter to rotate knob 15 to a position which is half the interspatial distance indicated by the scale on knob 15. Thus, if knob 15 is rotated to a position corresponding to a basic interspatial distance of ten, light rays would not only illuminate indications 26 but also would be present exactly half way between indications 26.

FIG. 2 illustrates in detail the internal structure of the apparatus of FIG. 1. Mounted on base 12 are two members, 19 and 19′, for supporting translucent cylindrical member or roller 16 to which is rigidly attached knob 15. An opaque member 17, for example, an exposed photographic film having transparent portions, lines 18, is mounted on and encircles translucent roller 16. A source of illumination 22, for example, a fluorescent lamp, mounted between brackets 21 and 21′ and concentric with roller 16, illuminates the interior of translucent roller 16. Electrical connections to source 22 have not been shown to avoid unnecessary complication of the drawings. Light rays emanating from source 22, within the interior of roller 16, will pass through translucent roller 16 and through the transparent portions or lines 18 of opaque member 17. Since the apparatus of FIG. 2 is generally enclosed in an opaque case, as shown in FIG. 1, the only light rays which will be perceptible, i.e., illuminate chart 13, are those rays emanating from the intersectional areas of transparent lines 18 and a slit 24 in a mask member 23. A cylindrical lens 25 focuses these beams of light on chart 13.

FIG. 3 illustrates, schematically, the path of these beams of light. The rays of light, for example beam 28, pass through translucent roller 16, through the transparent portions 18 (not visible in this view) of opaque member 17 and the slit in mask 23, and are focused by lens 25 through aperture 31 onto chart 13. Other rays of light, for example beam 29, are intercepted by case 11. Thus, the only rays of light which illuminate chart 13 are those emanating from the intersectional areas of transparent lines 18 and slit 24.

FIG. 4 illustrates the predetermined relationship of transparent lines 18 of opaque member 17. Consider the sheet of drawing to represent an opaque film which has transparent portions, lines 18, emanating from a common point indicated as the origin. The lines have slopes, respectively, which are the reciprocal of the integers $l$ through $n$, where $n$ is a whole number corresponding to a predetermined harmonic. If a horizontal line is drawn parallel to the abscissa, intersecting the ordinate at 10 c.p.s., it will also intersect lines 18 at the respective frequencies, 10, 20, 30, 40 c.p.s., et cetera, indicated on tne abscissa. Now if we consider the sheet of drawing to be mounted on roller 16 and the horizontal line to be represented by slit 24, in mask 23, the intersectional areas, again, will be at the above-indicated frequencies. Thus, as roller 16 is rotated, different portions of lines 18 are in coincidence with slit 24 of mask 23. Accordingly, rays of lights, emanating from the intersectional areas of lines 18 and slit 23, will have the interspatial distances between them continuously varied but always equally spaced as roller 16 is rotated. Thus, the apparatus of this invention develops discrete and accurately displaced beams of light whose interspatial separations may be varied with ease and accuracy.

It is to be understood that the embodiments shown and described are illustrative of the principles of the invention only, and that further modifications of this invention may be implemented by those skilled in the art without departing from the scope and spirit of the invention. For example, the present invention may find use in making drawings on a reduced scale, for subdividing established distances or dimensions, and for interpolating intermediate points on charts or graphs.

What is claimed is:

1. Optical apparatus comprising:
   translucent cylindrical means enveloped by an opaque member having transparent portions disposed in a prescribed manner,
   means for illuminating the interior of said cylindrical means,
   means having a slit therein contiguous with said cylindrical means for allowing the passage of a plurality of discrete spatially related light rays from the interior of said cylindrical means through the intersectional areas of the transparent portions of said opaque member and said slit,
   and means for rotating said cylindrical means to effect a change in the spatial relationship of said light rays in order to determine the basic interspatial separation of visual indicia upon which said light rays impinge.

2. Optical apparatus as defined in claim 1 wherein said opaque member comprises an exposed photographic film having a plurality of transparent lines thereon emanating from a common origin in a predetermined manner.

3. Optical apparatus as defined in claim 2 wherein said lines have slopes, respectively, which are the reciprocal of the integers 1 through $n$, where $n$ is a predetermined whole number.

4. Apparatus for determining the harmonic relationship of recorded visual indicia comprising:
   chart means having recorded on the surface thereof visual indications of a predetermined nature,
   translucent roller means encircled by an opaque member having transparent portions disposed in a prescribed manner,
   illumination means mounted within the interior of said roller means,
   mask means having a slit therein contiguous with said roller means and said chart means for allowing the passage of light rays from said illumination means through the intersectional areas of the transparent portions of said opaque member and the slit of said mask onto said chart means,
   and means for rotating said roller means to effect an identic correspondence between said visual indications and said light rays.

References Cited

UNITED STATES PATENTS

| | | | |
|---|---|---|---|
| 2,548,783 | 4/1951 | Goldsmith | 250—236 |
| 2,630,631 | 3/1953 | McMullen. | |
| 3,049,045 | 8/1962 | Miller et al. | |
| 3,234,845 | 2/1966 | Stavis. | |
| 3,323,415 | 6/1967 | Tobias. | |

OTHER REFERENCES

IBM Technical Disclosure Bulletin, Bernstein et al., vol. 8, No. 7, December 1965, page 986.

RALPH G. NILSON, *Primary Examiner.*

BRUCE L. ADAMS, *Assistant Examiner.*

U.S. Cl. X.R.

88—14; 250—236, 237